Sept. 13, 1932.                R. P. McBRIDE                1,876,717
                        MOTOR VEHICLE SIGNAL SWITCH
                            Filed Oct. 24, 1927
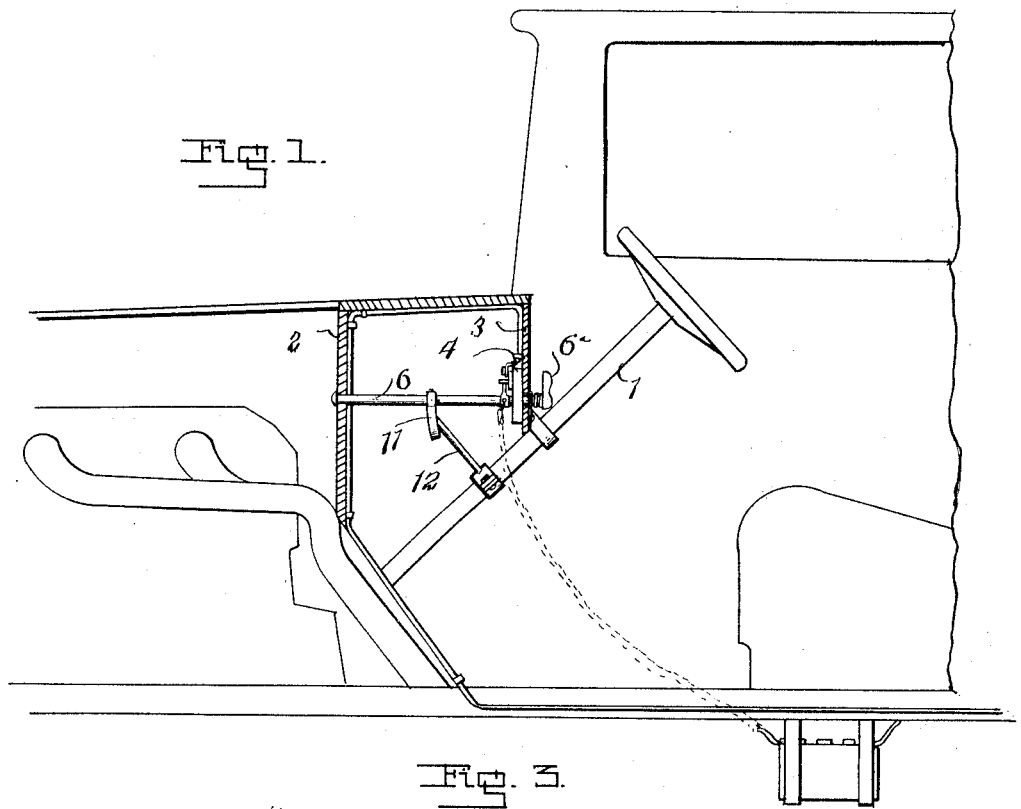
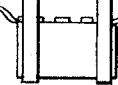
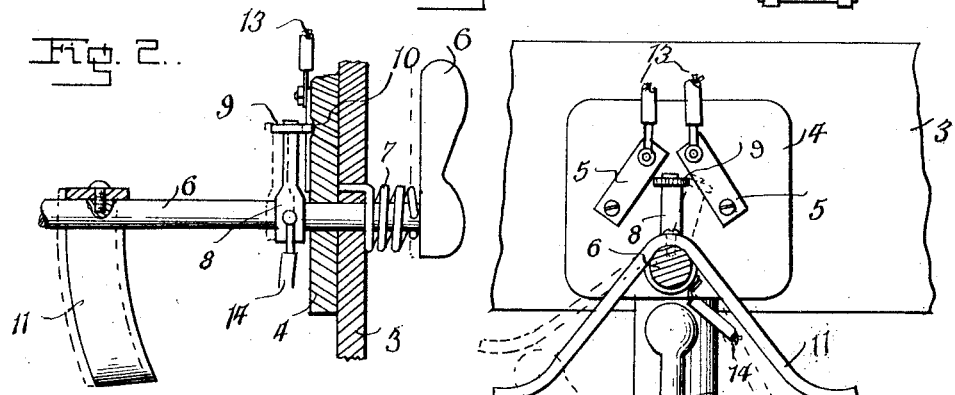
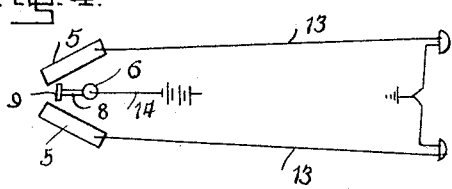
Inventor
R. P. McBride
By Lacey & Lacey, Attorneys Patented Sept. 13, 1932

1,876,717

UNITED STATES PATENT OFFICE

ROBERT P. McBRIDE, OF HAMPTON, VIRGINIA

MOTOR VEHICLE SIGNAL SWITCH

Application filed October 24, 1927. Serial No. 228,444.

The invention relates to vehicular signaling means whereby a driver of a mechanically propelled vehicle may signal his intention when about to make a turn, either to the right or to the left, thereby giving ample notice to the driver of the vehicle following, whereby to avoid a rear end collision or a congestion of traffic.

The invention provides signaling means under control of and adapted to be actuated by the driver when about to make a turn and associated with the steering mechanism and adapted to be operated thereby to restore the signal mechanism to normal or neutral position when the vehicle is traveling in a direct course on a street or highway.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a fragmentary view illustrative of an embodiment of the invention.

Figure 2 is an enlarged detail view of the circuit closing means of a signal lamp.

Figure 3 is a front view of the parts shown in Figure 2, together with a portion of the steering post and the trip arm mounted thereon.

Figure 4 is a diagram showing the signal lamp and circuit therefor.

Corresponding and like parts are referred to in the following description and designated in the several views of the drawing by like reference characters.

The numeral 1 designates the steering post of a motor vehicle which is mounted in any conventional way. The dash 2 and instrument board 3 may be of any approved construction and arrangement. A block 4 is mounted upon the front side of the instrument board 3 and has two contacts 5 applied thereto. A shaft 6 is mounted in the dash 2, block 4 and instrument board 3 in a manner to receive both a longitudinal and a rotary movement. A helical spring 7 is mounted upon the rear end of the shaft 6 and is attached at its ends to the instrument board 3 and shaft 6, as indicated most clearly in Figure 2 of the drawing. The spring 7 normally holds the shaft 6 in a predetermined position. An arm 8 is fast to the shaft 6 and projects laterally therefrom and is provided at its outer end with a wheel 9. A recess 10 is formed in the forward side of the block 4 and receives the wheel 9 when the arm 8 is in normal or predetermined position. The arm 8 constitutes the movable contact of the signal circuits. The strips 5 constitute the fixed contacts of the circuits. The spring 7 urges the shaft 6 rearwardly, thereby holding the wheel 9 in the recess 10, when the shaft 6 is in normal position. A lever 6a attached to the rear end of the shaft 6 provides convenient means for rotating said shaft to the right or to the left, as required, to close the circuit through the right or the left lamp according to the required direction of turn. When the shaft 6 is turned to the right or to the left, the wheel 9 rides out of the recess 10 and engages one or the other of the contacts 5, thereby closing the circuit to the right or the left signal lamp, as indicated most clearly in the diagrammatic view, Figure 4 of the drawing. The signal lamps are designated by the letters R and L, and are disposed at the right and the left of the vehicle in any determined way for ready observation from the rear. A substantially V-shaped strip 11 is attached to the shaft 6 and cooperates with the trip arm 12 projecting from the steering post 1. The terminals of the end portions of the strip 11 flare to prevent disengagement thereof from the arm 12. The strip 11 curves, as indicated most clearly in Figures 1 and 2, to maintain contact between the ends thereof and the trip arm 12.

One terminal of the signal lamp is grounded, the other terminal being connected to one of the contact strips 5 by means of a wire 13. One terminal of the battery B is grounded and the other terminal is connected by means of a wire 14 with the movable contact arm 8. The trip arm 12 has a limited movement with reference to the end portions of the element 11 to provide for steering on a direct course without affecting the directional signals. When about to make a turn, either to the right or to the left, the driver rotates the shaft 6 through the lever 6a, which moves the element 8 from a neutral position into engagement with one or the other of the contacts 5, thereby closing the circuit through either the right or the left signal lamp, with the result that the driver of a vehicle following is warned so that action may be taken to avoid a rear end collision or prevent any congestion of traffic. After the vehicle has made the turn and the steering post assumes a normal position, the shaft 6 is returned to the predetermined position by the arm 12 engaging an element of the trip 11. Casual displacement of the shaft 6 is prevented by entrance of the wheel 9 into the depression 10. It will thus be understood that the signal mechanism is automatically returned to normal position by the steering mechanism and is thrown into operative position by the driver when the vehicle is about to make a turn. Sufficient play is provided to prevent operation of the signal when steering on a direct course, whether the same be along straight or curved highways.

Having thus described the invention, I claim:

In a direction signal for motor vehicles, a shaft of a length to extend between a dash board and an instrument board and be rotatably and slidably engaged through the same with its rear end projecting rearwardly from the instrument board, an actuating handle upon the rear end of said shaft, a spring to resist rotary and sliding motion of the shaft, an arm carried by said shaft and extending radially therefrom to serve as a movable contact, stationary contacts, a plate to mount the stationary contacts at opposite sides of the movable contact in insulated relation to the shaft and each other, the plate being formed between the stationary contacts with a seat to receive the free end of the movable contact and the spring serving to yieldably retain the shaft in a normal position with the free end of the movable contact in the seat, an abutment carried by said shaft and having arms extending transversely from opposite sides of the shaft in diverging relation to each other, and an arm having means to connect the same to a steering post and mount the same in position to extend radially from the post between arms of the abutment and engage the same to return the shaft and movable contact to a normal position.

In testimony whereof I affix my signature.

ROBERT P. McBRIDE [L. S].